Patented July 14, 1953

2,645,621

UNITED STATES PATENT OFFICE 2,645,621

SULFONATED AROMATIC HYDROCARBON-ALIPHATIC POLYENE HYDROCARBON ION-EXCHANGE RESINS

Gaetano F. D'Alelio, Pittsburgh, Pa., assignor to Koppers Company, Inc., a corporation of Delaware No Drawing. Application September 24, 1949, Serial No. 117,726

22 Claims. (Cl. 260—2.2)

This invention relates to new ion-exchange resins. More particularly, it relates to the preparation of ion-exchange resins from polymerizable mono-vinyl-aromatic and mono-(alpha-alkyl-vinyl)-aromatic compounds and copolymerizable linear aliphatic polyenes.

Ion-exchange resins have been found desirable for a wide variety of commercial uses. For example, such resins are being used in the purification, deionization, or softening of water, the recovery of magnesium from sea water and brine, the recovery of copper and ammonia from waste cuprammonium solutions in rayon plants, the recovery of amino acids from protein hydrolyzates, recovery of certain vitamins from solutions, the separation of fission products obtained from uranium and plutonium, the separation of rare earths, the removal of sodium and copper from oils, the removal of iron and copper from acid liquors, various applications in analytical determinations and in catalyzing esterification, ester hydrolysis, sucrose inversion, etc., and even for the treatment of peptic ulcers.

One of the best types of ion-exchange resins for many of these purposes is disclosed in applicant's U. S. Patent 2,366,007, assigned to the General Electric Company. Cation-exchange resins of this type comprise sulfonated copolymers of mono-vinyl-aromatic compounds and divinyl-aromatic compounds, such as prepared by the sulfonation of an insoluble, infusible styrene-divinyl benzene copolymer. One commercial form of this type of cation-exchange resin is known as Dowex 50.

Divinyl benzene monomer, however, is not commercially available in highly concentrated form since purification methods do not permit concentrations higher than approximately 50 percent by weight of divinyl benzene. Such divinyl benzene mixtures as are available contain ethyl styrene, diethyl benzene, the various divinyl benzene isomers, etc. in varying proportions. This same condition is true also of other divinyl aryl compounds since the commonly used dehydrogenation method of preparing these divinyl aryl compounds from the corresponding dialkyl aryl compounds results in complex mixtures of the divinyl aryl compounds, the starting dialkyl aryl compounds and the intermediate mono-vinyl aryl compounds, as well as isomers and by-products of the divinyl aryl compounds. In any of these complex mixtures, most of the constituents have boiling points which are within a small temperature range and separation of the monomers by distillation requires careful fractionation. Since the unsaturated compounds, especially the divinyl aryls, have a great tendency to polymerize, the mixture cannot be subjected to a careful or prolonged distillation without considerable loss of monomer through polymerization. Therefore, the use of divinyl aryl compounds is generally limited to mixtures having concentrations of no more than about 50 percent divinyl aryl compound.

The fact that these divinyl aryl compounds are commercially available only in such complex mixtures in which the proportions of the various components are unpredictable and difficult to control makes it difficult to control exactly the nature of the copolymers resulting from polymerization with styrene, etc. Moreover, the presence of compounds such as diethyl benzene in the polymerization mixture retards the formation of high molecular weight polymers, and variations in the available amounts of divinyl aryl compounds in these mixtures cause variations in the amount of cross-linking accomplished in the resulting copolymers.

Ion-exchange resins of great utility have now been found which comprise the water-insoluble sulfonated derivatives of copolymers of at least one polymerizable mono-vinyl-aromatic or mono-(alpha-alkyl-vinyl)-aromatic compound and at least one copolymerizable linear aliphatic polyene.

Cross-linked copolymers of these compounds suitable for the practice of this invention can be prepared by any suitable method which will give infusible, insoluble resins, for example, by mass, solution, emulsion or suspension polymerization. The polymerizations may be advantageously catalyzed by various types of catalysts, such as peroxides, e. g., benzoyl, hydrogen, acetyl, acetylbenzoyl, phthalyl, lauroyl peroxides, t-butyl-hydroperoxide, etc.; per-compounds, e. g., ammonium persulfate, sodium persulfate, sodium perchlorate, etc.; Friedel-Crafts type catalysts, advantageously at low temperatures, e. g., $AlCl_3$, $SnCl_4$, $BF_3$, $H_2SO_4$, etc. When the Friedel-Crafts or ionic type catalysts are used, the polymerizable aromatic compound can be one of the difficultly polymerizable monomers of this class, that is an alpha-alkyl-vinyl-aryl compound, such as alpha-methyl-styrene, and the linear aliphatic polyene can also be somewhat sluggish in its copolymerizability, as in the case of 2-methyl-pentadiene-1,3, pentadiene-1,3, etc.

Mono-alkenyl aromatic compounds which can be used in the preparation of these copolymers have the formula

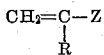

wherein R is hydrogen or an alkyl group advantageously of less than 3 carbon atoms and Z is an aryl group which has positions on an aromatic nucleus available for substitution. The formula includes vinyl aryls, such as styrene, vinyl naphthalene, vinyl diphenyl, vinyl fluorene, etc. and their nuclear-substituted derivatives such as alkyl, aryl, alkaryl, aralkyl, cycloalkyl, alkoxy, aryloxy, chloro, fluoro, chloromethyl, fluoromethyl, and trifluoromethyl nuclear derivatives, for example methyl-styrenes, e. g., o, m and p-methyl-styrenes, dimethyl-styrenes, o, m and p-ethyl styrenes, isopropyl-styrenes, tolyl styrenes, benzyl-styrenes, cyclohexyl-styrenes, methoxy-styrenes, phenoxy-styrenes, o, m and p-chloro-styrenes, o, m and p-fluorostyrenes, chloromethyl - styrenes, fluoromethyl - styrenes, trifluoromethyl-styrenes, vinyl-methyl-naphthalenes, vinyl-ethyl-naphthalenes, vinyl-chloro-naphthalenes, vinyl - methyl - chloro - naphthalenes, etc. The polymerizable monomers which can be used advantageously with ionic type catalysts include aromatic compounds having a vinyl group containing an alkyl group in its alpha position, e. g., isopropenyl or alpha-methyl-vinyl, alpha-ethyl-vinyl, alpha-propyl-vinyl, etc. Such alpha-alkyl-vinyl groups may be substituted on benzene, naphthalene, diphenyl, fluorene nuclei, etc. and may have other substituents on the aromatic nuclei as illustrated above for the vinyl aryl compounds. For ease of polymerization the alpha-alkyl groups are advantageously methyl or ethyl groups. It is also possible to make the resins of this invention from polymerizable monomers which have sulfonic acid groups attached to aromatic nuclei and thereby avoid any subsequent sulfonation step.

The linear aliphatic polyenes which can be used as cross-linking agents in these copolymers are butadiene-1,3; isoprene or 2-methyl-butadiene-1,3; 2,3-dimethyl-butadiene-1,3; 2-methyl-pentadiene-1,3; hexadiene-1,5; hexatriene-1,3,5; myrcene; ocimene; allo-ocimene; etc., and certain substituted aliphatic polyenes such as chloro, fluoro, and aryl derivatives, e. g., chloroprene or 2-chloro-butadiene-1,3; fluoroprene or 2-fluoro-butadiene-1,3; 1 - phenyl - butadiene-1,3; etc. As previously mentioned the copolymerization of the less active polyenes of this class can advantageously be catalyzed by the use of Friedel-Crafts or ionic type catalysts.

Some copolymers prepared by the copolymerization of these vinyl- and alpha-alkyl-vinyl-aromatic compounds with linear aliphatic polyene compounds are not new and have been disclosed previously. However, the sulfonated derivatives of these cross-linked copolymers which are suitable for use as ion-exchange resins are new and are claimed herein.

The invention may be best described by the following examples. These examples serve to illustrate various methods of practicing the invention and are not intended as limitations to the scope of the invention. In these examples and throughout the specification "parts" and "percent" are given in parts and percent by weight.

*Example I*

Cross-linked copolymers in bead form are made by suspension polymerization in a pressure-tight autoclave by the following procedure. To the autoclave are added:

0.18 part benzoyl peroxide—dissolved in the styrene
0.05 part t-butyl perbenzoate—dissolved in the styrene
90 parts styrene
10 parts butadiene-1,3
200 parts distilled water
3 parts hydroxy apatite (submicronic particle size)
0.03 part sodium oleate The autoclave is then closed and agitated by a rocking mechanism while the autoclave is immersed in a controlled-temperature bath at 90° C. for 7 hours and then at 113–115° C. for 3 hours. In each case, the resultant copolymer beads are washed with dilute HCl, then with water, and subsequently dried at 70° C. for about two hours.

Fifty parts of these copolymer beads are sulfonated by reacting with about 290 parts chlorosulfonic acid until hydrogen chloride is no longer liberated. The beads are removed from unreacted chlorosulfonic acid and by-products by filtration or decantation, and the sulfonated beads are then treated with a large volume of water to destroy any residual chlorosulfonic acid and any acid chloride that might have formed. After filtering, washing and drying, a good yield of sulfonated copolymer is obtained. From the weight of the yield as compared to the original weight of copolymer, it is possible to calculate approximately the average number of sulfonic acid groups which have been substituted onto each aryl nucleus. By the preceding technique it is generally possible to attach an average of 1.5 or more sulfonic acid groups to each aryl nucleus. For many applications as little as an average of 0.1 sulfonic group per aryl nucleus may be introduced.

In the preceding example the butadiene may be replaced by chloroprene, isoprene, etc., and the sulfonation may be accomplished also by using sulfuric acid, fuming sulfuric acid, sulfur trioxide alone or in the presence of liquid $SO_2$ or another non-reactive diluent, etc. The following examples illustrate how the sulfonated copolymers of this invention can be used for adsorbing cations from liquid media.

*Example II*

Ten parts of the water-insoluble sulfonated copolymer of Example I are wet with 100 parts of distilled water, and 200 parts of standardized sodium hydroxide solution are added with shaking. After standing 15 minutes the solution is filtered and the sodium hydroxide remaining in solution is determined by titrating the filtrate with standardized hydrochloric acid. The efficiency of the resin is determined by calculating the ratio of sodium ions actually removed from the solution to the sodium ions theoretically removable. A very good efficiency is shown by calculations which indicate that approximately each of the calculated sulfonic acid groups in the copolymer removes a sodium ion from the solution. The sulfonated resin can also be converted to the sodium salt by treatment with a dilute or concentrated sodium chloride solution.

*Example III*

Ten parts of the water-insoluble sulfonated copolymer of Example I are wet with 100 parts of distilled water, and then 200 parts of a standardized calcium chloride solution are added with shaking. After standing 15 minutes, the solution is filtered and the hydrochloric acid generated by the adsorption of the calcium ion from the solution is determined by titration with standardized sodium hydroxide solution. A good ion-exchange efficiency of the resin is indicated by calculations made according to the method described in Example II.

*Example IV*

The exhausted resin from Example II is regenerated by treating it with approximately ⅓ N hydrochloric acid. After filtering off the acid and washing well with distilled water, the sulfonated copolymer is retested for its ability to adsorb cations according to the method described in Example II. The efficiency after regeneration approximates the original capacity of the resin.

Although the above examples show the use of copolymers made by polymerizing mixtures of 90 percent styrene and 10 percent butadiene, it will be understood that other proportions of these monomers and of the various polymerizable mono-vinyl- and mono-(alpha-alkyl-vinyl)-aromatic compounds and polyene compounds can be used for preparing the water-insoluble, sulfonated copolymers. The exact amount required to give sufficient cross-linking for insolubility depends on the particular cross-linking agent used but generally the proportions of monomers are advantageously about 98-75 percent of the alkenyl aromatic compound and about 2-25 percent of the polyene. The alkenyl aromatic portion of the polymerizable mixtures may consist of a single alkenyl aromatic compound or mixtures of any number of the alkenyl aromatic compounds indicated, and likewise the polyene portion may consist of a single polyene compound or mixtures of any number of the polyene compounds indicated. Minor portions of certain other monomers, such as isobutylene, ethylene, etc., may be used with the alkenyl aromatic and polyene compounds. However, these other monomers should not have functional groups which will interfere with the sulfonation treatment or ion-exchange activities of the products, or which may be ruptured to give substantial decrease in length of polymer chains or in cross-linking.

Since the sulfonic acid groups are the active ion-removing groups in these products and since these groups can only be introduced easily into an aryl nucleus, it is advantageous that the major portion of the polymerization mixture be of polymerizable monomers containing an aryl nucleus and it is necessary that there are positions available on the aryl nucleus for attaching sulfonic acid groups. For this latter reason it is advantageous that the aryl nucleus has few, if any, substituents thereon. Moreover, instead of starting with a monomer mixture of the alkenyl aromatic and the polyene compounds, it is also possible to add the polyene compounds to partial polymers of the alkenyl aromatic compounds and effect cross-linking by subsequently completing the polymerization.

As previously mentioned, in addition to chlorosulfonic acid other sulfonating agents may be used, e. g., concentrated sulfuric acid, fuming sulfuric acid, sulfur trioxide, etc. In the use of sulfonating agents such as sulfuric acid it is possible that cross-linking may be completed under the catalytic effect of the sulfuric acid either by polymerization or alkylation of the aromatic rings by the olefinic unsaturation in the polymer chain.

Cations which may be removed from various solutions by the sulfonated, insoluble polymers of this invention include, in addition to the cations indicated in the examples, lead ions, magnesium ions, iron ions, silver ions, etc. In fact any cations which react with the sulfonic acid groups of the resin to form salts will be effectively removed from the solution. After the sulfonated resin has adsorbed the cations, it can readily be regenerated by washing with dilute acid, preferably a mineral acid which forms soluble salts with the adsorbed cations.

An inert material such as diatomaceous earth, Alundum, coke, silica, cinders, porous glass, etc. may be used as a carrier for the resin in order to increase the effective surface of the resin for ion-exchange. These carriers may be introduced by adding them any time prior to complete polymerization of the monomers to an infusible, insoluble state. An emulsion or dispersion type of polymerization is advantageous for the coating of such carrier materials with the resin.

The sulfonation reactions may be effected on various forms of the cross-linked copolymers, e. g., powder, bead, pellet, coating, etc. However, since the ion-exchange utility of the product is related to effective surface, it is often advantageous to have the copolymer shaped in the particular physical form in which it will ultimately be used so that the greatest concentration of sulfonic acid groups will be on easily accessible surfaces. For this reason, it is advantageous that the copolymer be prepared directly in bead form by suspension polymerization—the size of the beads being controlled by appropriate modification of the suspension polymerization technique—and that the beads be sulfonated to give the sulfonated cross-linked copolymers in convenient bead form ready to be employed in an ion-exchange system without further modification.

While there are above disclosed but a limited number of embodiments of the invention, it is possible to produce still other embodiments without departing from the inventive concept herein disclosed, and it is, therefore, desired that only such limitations be imposed upon the appended claims as are stated therein or required by the prior art.

The invention claimed is:

1. A water-insoluble resin containing a plurality of sulfonic acid groups, said groups being attached to an insoluble, infusible resin prepared by the polymerization of a polymerizable mass comprising (1) from about 75% to about 98% polymerizable aromatic compound selected from the class consisting of polymerizable mono-vinyl-aromatic and mono-(alpha-alkyl-vinyl)-aromatic hydrocarbon compounds in which the alkyl group is chosen from the class consisting of methyl and ethyl, and (2) from about 2% to about 25% copolymerizable linear aliphatic polyene hydrocarbon compound.

2. A water-insoluble resin of claim 1, in which the polymerizable aromatic compound is styrene.

3. A water-insoluble resin of claim 1, in which the polymerizable aromatic compound is alpha-methyl-styrene.

4. A water-insoluble resin of claim 1, in which the copolymerizable polyene is butadiene-1,3.

5. A water-insoluble resin of claim 1, in which the copolymerizable polyene compound is isoprene.

6. A water-insoluble resin of claim 1, in which the polymerizable aromatic compound is styrene and the copolymerizable polyene compound is butadiene-1,3.

7. An insoluble, infusible sulfonated polymeric alpha-methylstyrene containing in the polymer molecule from about 75% to about 98% alpha-methylstyrene and from about 2% to about 25% copolymerizable linear aliphatic polyene compound.

8. An insoluble, infusible, sulfonated polymeric styrene containing in the polymer molecule from about 2% to about 25% butadiene-1,3, based on the weight of the molecule exclusive of the sulfonic acid groups.

9. An insoluble, infusible, sulfonated polymeric styrene containing in the polymer molecule from about 2% to about 25% isoprene, based on the weight of the molecule exclusive of the sulfonic acid groups.

10. A water-insoluble resin of claim 1, in which the resin is in bead form.

11. A water-insoluble resin of claim 1, in which the polymerizable aromatic compound is styrene and the resin is in bead form.

12. A water-insoluble resin of claim 1, in which the polymerizable aromatic compound is alpha-methyl-styrene and the resin is in bead form.

13. A water-insoluble resin of claim 1, in which the polymerizable aromatic compound is styrene, the copolymerizable polyene compound is butadiene-1,3 and the resin is in bead form.

14. An inert carrier coated with a water-insoluble resin of claim 1.

15. In a process for the preparation of a water-insoluble, ion-exchange resin, the step of sulfonating an insoluble, infusible polymerization product of a polymerizable mixture comprising (1) from about 75% to about 98% polymerizable aromatic compound selected from the class consisting of polymerizable mono-vinyl-aromatic and mono-(alpha-alkyl-vinyl)-aromatic hydrocarbon compounds in which the alkyl group is chosen from the class consisting of methyl and ethyl, and (2) from about 2% to about 25% copolymerizable linear aliphatic polyene hydrocarbon compound.

16. The process of claim 15, in which the polymerizable aromatic compound is styrene.

17. The process of claim 15, in which the copolymerizable polyene compound is butadiene-1,3.

18. The method of treating liquid media to remove cations therefrom which comprises contacting said media with a water-insoluble, sulfonated resin and separating said resin from the liquid media, said resin comprising the sulfonated insoluble, infusible polymerization product of a mixture comprising (1) from about 75% to about 98% polymerizable aromatic compound selected from the class consisting of polymerizable mono-vinyl-aromatic and mono-(alpha-alkyl-vinyl)-aromatic hydrocarbon compounds in which the alkyl group is chosen from the class consisting of methyl and ethyl, and (2) from about 2% to about 25% copolymerizable linear aliphatic polyene hydrocarbon compound.

19. The method of claim 18, in which the polymerizable aromatic compound is styrene.

20. The method of claim 18, in which the polymerizable aromatic compound is alpha-methylstyrene.

21. The method of claim 18, in which the polymerizable aromatic compound is styrene and the copolymerizable polyene compound is butadiene-1,3.

22. The method of claim 18, in which the polymerizable aromatic compound is alpha-methylstyrene and the copolymerizable polyene compound is butadiene-1,3.

GAETANO F. D'ALELIO.

References Cited in the file of this patent

UNITED STATES PATENTS

| Number | Name | Date |
| --- | --- | --- |
| 2,333,142 | Behrman | Nov. 2, 1943 |
| 2,446,536 | Hardy | Aug. 10, 1948 |
| 2,466,675 | Bauman | Apr. 12, 1949 |
| 2,518,420 | Evers | Aug. 8, 1950 |
| 2,539,824 | Garber | Jan. 30, 1951 |